United States Patent
Scott et al.

(10) Patent No.: US 10,400,891 B2
(45) Date of Patent: Sep. 3, 2019

(54) SYSTEM, METHOD AND APPARATUS TO CONTROL MACHINE ACCELERATION WHEN EXITING A GRADE

(71) Applicant: Caterpillar Inc., Peoria, IL (US)

(72) Inventors: Austin J. Scott, Naperville, IL (US); Barry Mei, Oswego, IL (US); Michael D. Mitchell, Aurora, IL (US)

(73) Assignee: Caterpillar Inc., Deerfield, IL (US)

( * ) Notice: Subject to any disclaimer, the term of this patent is extended or adjusted under 35 U.S.C. 154(b) by 73 days.

(21) Appl. No.: 15/844,439

(22) Filed: Dec. 15, 2017

(65) Prior Publication Data

US 2018/0172147 A1   Jun. 21, 2018

Related U.S. Application Data

(60) Provisional application No. 62/434,772, filed on Dec. 15, 2016.

(51) Int. Cl.
| | |
|---|---|
| *F16H 61/66* | (2006.01) |
| *F16H 61/16* | (2006.01) |
| *F16H 61/21* | (2006.01) |
| *F16H 59/44* | (2006.01) |
| *F16H 59/70* | (2006.01) |
| *F16H 59/66* | (2006.01) |

(52) U.S. Cl.
CPC ............ *F16H 61/66* (2013.01); *F16H 61/16* (2013.01); *F16H 61/21* (2013.01); *F16H 59/44* (2013.01); *F16H 59/66* (2013.01); *F16H 59/70* (2013.01); *F16H 2059/663* (2013.01); *F16H 2059/704* (2013.01); *F16H 2061/166* (2013.01); *F16H 2061/6612* (2013.01)

(58) Field of Classification Search
None
See application file for complete search history.

(56) References Cited

U.S. PATENT DOCUMENTS

| | | |
|---|---|---|
| 5,231,897 A | 8/1993 | Morita |
| 5,816,979 A | 10/1998 | Shiiba et al. |
| 5,941,793 A * | 8/1999 | Ito .................. F16H 61/0213 477/120 |
| 6,070,118 A | 5/2000 | Ohta et al. |

(Continued)

FOREIGN PATENT DOCUMENTS

| | | |
|---|---|---|
| JP | 2000-035114 A | 2/2000 |
| JP | 2000-295720 A | 10/2000 |

*Primary Examiner* — Dirk Wright
(74) *Attorney, Agent, or Firm* — Oblon, McClelland, Maier & Neustadt (57) ABSTRACT

A system, method, and apparatus for controlling acceleration of a machine when the machine exits a grade. The system, method, and apparatus may determine a virtual gear having a maximum speed limit equivalent that matches the speed of the machine as the machine exits the grade. The system, method, and apparatus may also deactivate an automatic retarding control (ARC) strategy, which may be activated when the machine is on the grade to reduce and limit the speed of the machine to no more than a set speed, if the ARC strategy is active as the machine exits the grade. The system, method, and apparatus may also control automatic downshift of a transmission system to the virtual gear if the ARC mode was activing during the exit from the graded surface and is now deactive.

20 Claims, 6 Drawing Sheets

(56) References Cited

U.S. PATENT DOCUMENTS

| | | | |
|---|---|---|---|
| 6,249,733 B1 | 6/2001 | Smith | |
| 6,405,120 B1 | 6/2002 | Higashimata et al. | |
| 7,987,034 B2 * | 7/2011 | Taffin | F16H 61/21 |
| | | | 701/51 |
| 8,014,925 B2 * | 9/2011 | Saitou | F16H 61/0213 |
| | | | 180/337 |
| 8,068,964 B2 | 11/2011 | Wolfgang | |
| 8,165,764 B2 * | 4/2012 | Wolfgang | F16H 61/0213 |
| | | | 701/58 |
| 9,429,229 B2 * | 8/2016 | Ajimoto | F16H 61/21 |
| 10,253,871 B2 * | 4/2019 | Hose | B60W 10/11 |
| 2011/0125376 A1 | 5/2011 | Chappell et al. | |
| 2011/0190992 A1 * | 8/2011 | Kleila | F16H 61/21 |
| | | | 701/58 |
| 2015/0198240 A1 | 7/2015 | Ajimoto | |
| 2018/0299008 A1 * | 10/2018 | Wippler | F16H 61/0213 |

* cited by examiner

SYSTEM, METHOD AND APPARATUS TO CONTROL MACHINE ACCELERATION WHEN EXITING A GRADE

CROSS-REFERENCE TO RELATED APPLICATIONS

This application claims the benefit of Provisional Application No. 62/434,772, filed Dec. 15, 2016, the entirety of which is incorporated herein by reference.

TECHNICAL FIELD

The present disclosure relates to systems, methods, and apparatuses for controlling machine acceleration. More particularly, the present disclosure relates to systems, methods, and apparatuses for controlling machine acceleration when exiting a grade.

BACKGROUND

Speed of a machine may be controlled as the machine travels downhill or down a grade. U.S. Pat. No. 8,401,753 (hereinafter the '753 patent) describes a method for automatically controlling the downhill speed of a machine. According to the '753 patent, the method may include establishing a target machine speed based on a current machine speed and determining whether at least one trigger condition including a grade greater than a predetermined threshold has been satisfied. If satisfied, the method may activate a control system to control at least one of a powertrain retarder and a change in a transmission gear to prevent exceeding the target machine speed.

SUMMARY

In one aspect of the present disclosure, a control system to prevent unintended acceleration of a machine when the machine exits a graded surface onto a first horizontal surface is described. The control system may be comprised of a memory configured to store a gear indicator associated with a gear of a transmission system of the machine as the machine enters the graded surface from a second horizontal surface. The control system may also be comprised of a controller in communication with the memory. The controller may be configured to determine when the machine enters the graded surface, activate an automatic retarding control (ARC) strategy when the machine enters the graded surface to reduce and limit the speed of the machine to no more than a second speed that is less than a first speed at which the machine is travelling when the machine enters the graded surface, if the first speed is greater than the second speed, determine the speed of the machine as the machine exits the graded surface, and determine a virtual gear having a maximum speed limit equivalent that matches the speed of the machine as the machine exits the graded surface. The controller may also be configured to determine whether the ARC strategy is active as the machine exits the graded surface, deactivate the ARC strategy if the ARC strategy is active as the machine exits the graded surface, and control downshift, of the transmission system, to the virtual gear if the ARC strategy was active as the machine exits the graded surface and is no longer active when the machine exits the graded surface. That is, the controller may be configured to determine whether the ARC strategy is active while exiting the graded surface, deactivate the ARC strategy once the machine exited the graded surface, control downshift of the machine if the ARC strategy was active when exiting the grades surface and now is not active, because the controller caused the ARC strategy to be turned off, rather than that the ARC strategy was inactive when exiting the graded surface.

In another aspect of the present disclosure, a computer-implemented method of controlling unintended acceleration of a machine when the machine exits a graded surface onto a first horizontal surface is described. The computer-implemented method may comprise determining a speed of the machine as the machine exits the graded surface; and determining a virtual gear having a maximum speed limit equivalent that matches the speed of the machine as the machine exits the graded surface. The computer-implemented method may also comprise checking whether an automatic retarding control (ARC) strategy was active as the machine exited the graded surface and is no longer active, the ARC strategy reducing and limiting the speed of the machine to no more than a first speed that is less than a second speed of the machine at which the machine is travelling when the machine enters the graded surface; and controlling downshift of the transmission system to the virtual gear if the ARC strategy was active as the machine exits the graded surface and is no longer active when the machine exits the graded surface.

In yet another aspect of the present disclosure, a machine is described. The machine may comprise: a memory configured to store a gear indicator associated with a gear of a transmission system of the machine as the machine enters a graded surface from a first horizontal surface; and a controller in communication with the memory, the controller configured to: determine a speed of the machine as the machine exits the graded surface onto a second horizontal surface, determine a virtual gear having a maximum speed limit equivalent that matches the speed of the machine as the machine exits the graded surface, check whether an automatic retarding control (ARC) strategy was active as the machine exits the graded surface and is no longer active, the ARC strategy reducing and limiting the speed of the machine to no more than a first speed that is less than a second speed of the machine at which the machine is travelling when the machine enters the graded surface, and control downshift of the transmission system to the virtual gear if the ARC strategy was active as the machine exits the graded surface and is no longer active when the machine exits the graded surface.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter may and/or do cover modifications and variations of the described embodiments.

It must also be noted that, as used in the specification, appended claims and abstract, the singular forms "a," "an," and "the" include plural references unless the context clearly dictates otherwise. That is, unless clearly specified otherwise, as used herein the words "a" and "an" and the like carry the meaning of "one or more." Additionally, it is to be understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, some embodiments of the present disclosure may involve systems, methods, and apparatuses for controlling acceleration of a machine when the machine exits a graded surface, which may be referred to herein as a grade or downhill surface, onto a flat surface. The machine may be operating in an automatic retarding control (ARC) mode at least prior to and during the exit from the graded surface. The ARC mode, if active during the exit from the graded surface, may be deactivated during or upon the transition onto the flat surface, and the machine may be controllably downshifted to a determined gear (e.g., virtual gear) associated with a determined speed of the machine just prior to the machine exiting the graded surface. That is, in some embodiments of the disclosed subject matter, the systems, methods, and apparatuses may check (i) whether the ARC mode was active as the machine exited the graded surface and (ii) whether the ARC mode was active on the graded surface but is no longer active, for instance, because the ARC mode has been inactivated or suspended when the machine is on the graded surface. If ARC mode is determined to be active as the machine exits the graded surface, the machine may be controllably downshifted to the determined gear (e.g., a virtual gear). In contrast, if the ARC mode is no longer active as the machine exits the graded surface, the machine may not be controllably downshifted. Optionally, some embodiments of the disclosed subject matter may also involve, when the machine is on the flat surface, receiving an operator-issued command to resume a higher transmission gear associated with the speed of the machine just prior to the machine entering the graded surface.

Figure 1:
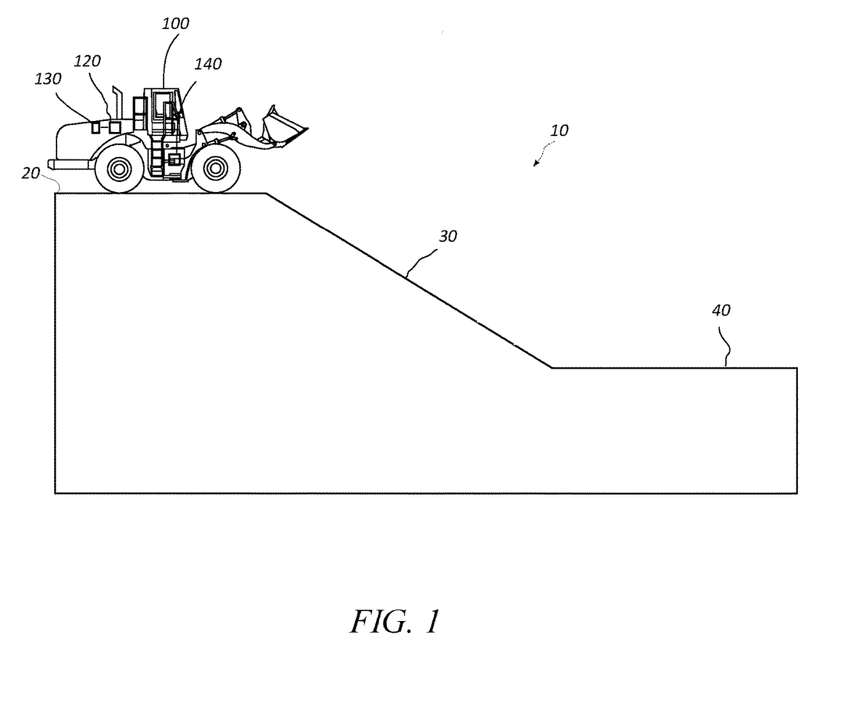
FIG. 1 is a diagrammatic view of a machine on a flat upper surface moving toward a downhill or graded surface, according to one or more embodiments of the disclosed subject matter.
Figure 2:
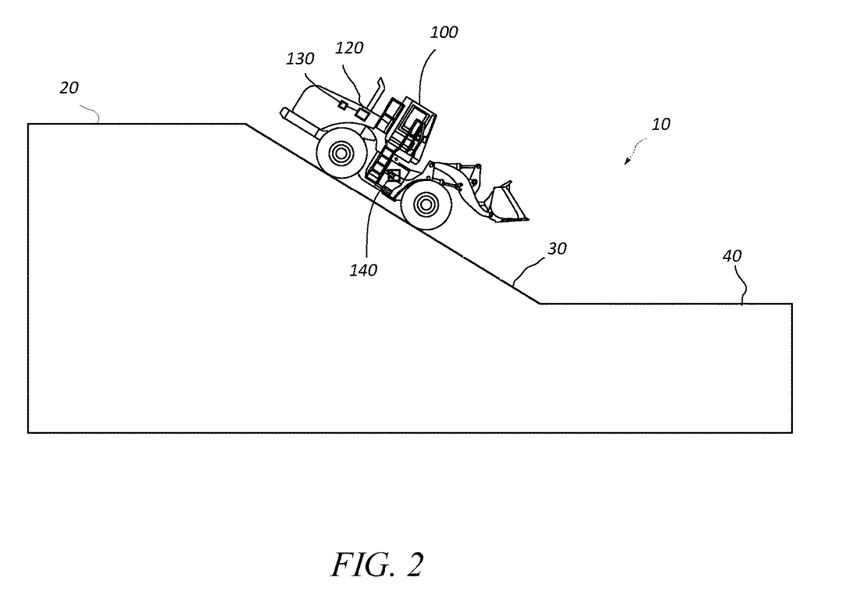
FIG. 2 is a diagrammatic view of the machine of FIG. 1 moving down the downhill surface, according to one or more embodiments of the disclosed subject matter.
Figure 3:
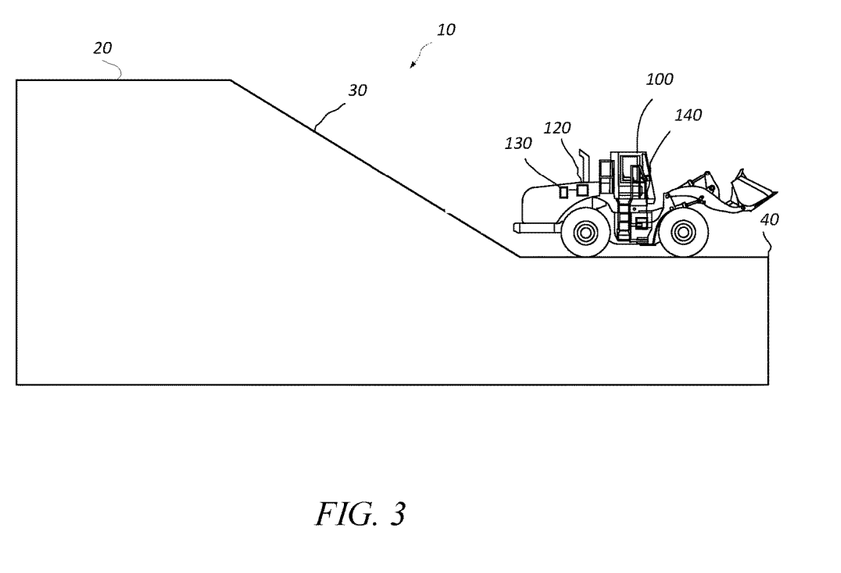
FIG. 3 is a diagrammatic view of the machine of FIG. 1 on a flat lower surface having exited the downhill surface of FIG. 2, according to one or more embodiments of the disclosed subject matter.

FIGS. 1-3 diagrammatically show a machine 100, according to one or more embodiments of the disclosed subject matter, on various surfaces of a terrain 10, which may be comprised of a horizontal or flat upper surface 20, a graded surface 30, and a horizontal or flat lower surface 40. More specifically, FIGS. 1-3 show the machine 100 moving along the flat upper surface 20 to the graded surface 30, then from the graded surface 30 onto the flat lower surface 40. Of course, though FIGS. 1-3 illustrate the machine 100 moving forward down the graded surface 30, in one or more embodiments, the machine 100 may be moving in reverse or backward down the graded surface 30.

The machine 100 is illustrated in FIGS. 1-3 as a wheel loader. However, embodiments of the disclosed subject matter are not limited to wheel loaders and may include other moving machines or vehicles, such as off-highway trucks, earth moving machines, other types of wheel loaders, compactors, excavators, track type tractors, dozers, motor graders, and wheel tractor-scrapers. Further, in one or more embodiments, the machine 100 may be a machine configured to implement a throttle lock or an analog thereof, such as cruise control. Alternatively, the machine 100 may not be configured to implement throttle lock (or an analog thereof).

Not expressly shown, the machine 100 may include a powertrain, for example, mounted on the rear frame. The powertrain, generally, may include a power source and a transmission system 140, which may provide motive power to at least a pairs of wheels, for example, and thereby provide movement to the machine 100. The power source may be, for example, a diesel engine, a gasoline engine, a natural gas engine, an electrical engine, a hybrid engine, or any other engine known in the art (also not expressly shown). The power source may alternatively be a fuel cell, power storage device, or the like. Further, the transmission system 140 may implement an electric drive transmission, a mechanical transmission, a hydraulic transmission, or any other transmission type known in the art. In some examples, the transmission system 140 may be operable to produce multiple output speed ratios (or a continuously variable speed ratio, i.e., a continuous variable transmission (CVT))

between the power source and driven pair(s) of wheels. For example, the transmission system 140 may include a front differential and a rear differential (not shown) coupled with a front axle assembly and a rear axle assembly, respectively. In some examples, the transmission system 140 may further include a torque converter (not shown) that may assist with transmission of torque generated by the power source.

The machine 100 may also include a controller 120. Generally, the controller 120 may control speed of the 100 machine when the machine 100 travels down the graded surface 30 and exits or has exited the graded surface 30 onto the flat lower surface 40. Thus, the controller 120 may be configured to receive signals from various systems of the machine 100 and output signals to control various systems of the machine 100, such as the transmission system 140 and/or the power source system. Optionally, the controller 120 may be part of or in communication with an engine control module (ECM) to control an engine of the machine 100. The controller 120 may also include circuitry components, such as a bus, to provide communication and control data between components of the controller 120 or components coupled thereto. The controller 120 may further include an input/output interface configured to facilitate communication with various components of the machine 100, such as the power source system, the transmission system 140, sensors, actuators, etc. Various other components may be associated with the controller 120 including, but not limited to, a power supply module or modules, a signal processing module or modules, a data processing module or modules, a data output module or modules, etc.

The controller 120 also may include or be in communication with a memory 130. The memory 130 may store a gear indicator associated with a gear, of a transmission system 140 of the machine 100, as the machine 100 enters the graded surface 30 from the flat upper surface 20. The gear indicator may be information or data that identifies the gear of the transmission system 140 as the machine 100 enters the graded surface 30 from the flat upper surface 20. Further, the controller 120 may retrieve the gear indicator from the memory 130. For example, the controller 120 may retrieve the gear indicator to control upshift of the transmission system 140 to the gear associated with the gear indicator. The memory 130 also may store speed data corresponding to determined speeds of the machine 100 along various positions of the terrain 10.

The controller 120 may control operation of the machine 100, for instance, speed control, by executing operating instructions, such as, computer-readable program code stored in the memory 130. For example, the controller 120 may, according to some embodiments of the disclosed subject matter, control speed of the machine 100 when the machine 100 transitions from the graded surface 30 onto the flat lower surface 40.

For example, the machine 100 may be operating in an automatic retarding control (ARC) mode at least prior to and during the exit from the graded surface 30. The ARC mode, if still active during the exit from the graded surface, may be deactivated during or upon the transition onto the flat lower surface 40, and the machine 100 may be controllably downshifted to a determined gear (e.g., virtual gear) associated with a determined speed of the machine 100 just prior to the machine 100 exiting the graded surface 30. For example, the controller 120 may check (i) whether the ARC mode was active as the machine exited the graded surface and (ii) whether the ARC mode was active on the graded surface 30 but is no longer active, for instance, because the ARC mode has been inactivated or suspended when the machine 100 is on the graded surface 30. If the controller 120 determines that the ARC mode is active as the machine 100 exits the graded surface 30, the controller 120 may cause the machine 100 to be downshifted to the determined gear (e.g., virtual gear). In contrast, if the controller 120 determines that ARC mode is no longer active as the machine 100 exits the graded surface 30, the controller 120 may not control downshift of the machine 100.

Additionally or alternatively, in some embodiments of the disclosed subject matter, the controller 120 may provide control to resume a higher transmission gear. The higher gear may be associated with the speed of the machine 100 just prior to the machine 100 entering the graded surface 30, when the machine 100 is on the flat lower surface 40, after the downshift to the determined gear (e.g., virtual gear) associated with a determined speed of the machine 100 just prior to the machine 100 exiting the graded surface 30. That is, the machine 100 may be upshifted to a transmission gear of the machine 100 when the machine 100 entered the graded surface 30 and before being downshifted. For example, the controller 120 may receive a gear indicator from the memory 130 and control the upshift to the gear associated with the gear indicator. Receipt of the gear indicator and the upshift may be controlled in response to a single operator request by an operator of the machine 100. Optionally, in response to the single operator request, the controller 120 may control the upshift to the gear associated with the gear indicator when the single operator request is received within a predetermined time period after the machine 100 has exited the graded surface 30 onto the flat lower surface 40.

Figure 4:
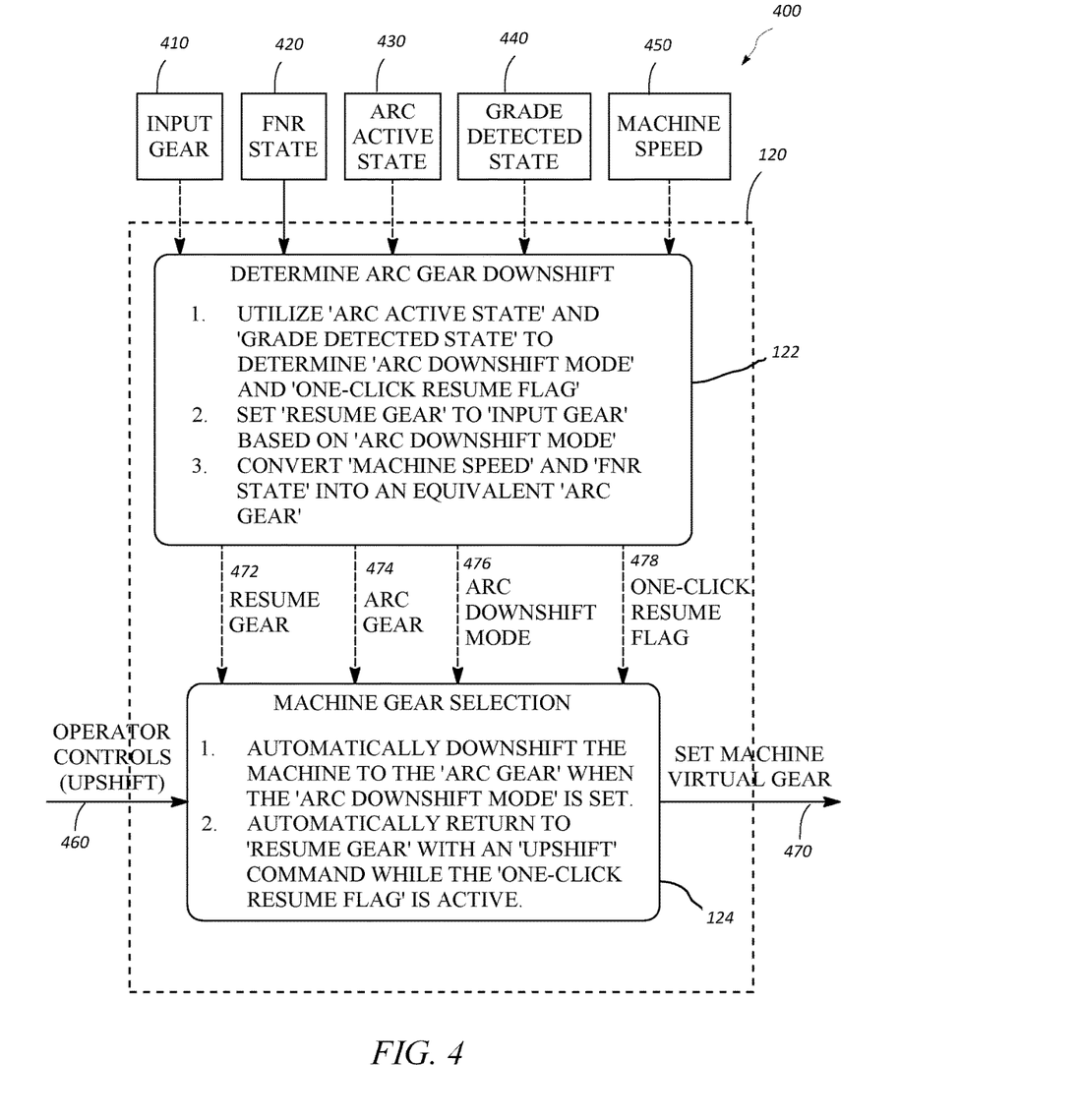
FIG. 4 is a block diagram of a control system for controlling acceleration of a machine according to one or more embodiments of the disclosed subject matter.

FIG. 4 is a block diagram of a control system 400 for controlling acceleration of a machine, such as the machine 100, according to one or more embodiments of the disclosed subject matter.

The control system 400 may be comprised of the controller 120 and the memory 130, whether separate from the controller 120 as illustrated in FIG. 4, or part of the controller 120. The control system 400 may provide inputs to the controller 120, and the controller 120, in turn, may output one or more control signals, such as illustrated in FIG. 4.

For example, the controller 120 may receive as inputs an input gear 410, which may be received from the memory 130, and which may be the gear indicator associated with a gear of the transmission system 140 of the machine 100 as the machine 100 enters the graded surface 30 from the flat upper surface 20; a Forward-Neutral-Reverse (FNR) state of the transmission system 420; an ARC state of the ARC system (e.g., active or inactive) 430; a grade state (e.g., flat or graded surface) 440; and a speed 450 of the machine 100.

Thus, the control system 400 may also include some or all of the corresponding components that send the inputs to the controller 120. For example, the memory 130 may send the input gear 410, which may be represented as the gear indicator that corresponds to a gear of the transmission system 140 as the machine 100 enters the graded surface 30 from the flat upper surface 20; the transmission system 140 (e.g., a sensor thereof, which may include a distinct FNR operator interface) may provide a signal regarding the FNR state 420 of the machine 100; a sensor or controller of the ARC system may send a signal representative of the state of the ARC system (e.g., active or inactive) 430; one or more grade detection sensors may send one or more signals representative of a detected grade state (e.g., flat or graded surface) 440 for a surface on which the machine 100 is provided; and one or more speed sensors may send one or more signals representative of the speed 450 of the machine 100. The controller 120 may also receive input signals in the form of one or more shift commands 460, such as a shift commands from the operator via a shift interface of the machine 100. Such shift command may be a command for upshifting, as shown in FIG. 4. Optionally, the shift command may be or include a single operator request, such as described above, to upshift, for instance, directly, to the gear associated with the gear indicator.

The control system 400, for instance, the controller 120, may: determine when the machine 100 enters the graded surface 30 based on one or more signals representative of the detected grade state 440 from the one or more grade detection sensors; activate an ARC strategy to reduce and limit the speed of the machine 100 when the machine 100 is determined to enter the graded surface 30, where such speed may be no more than a speed that is less than a speed of the machine 100 when the machine 100 entered the graded surface 30 (e.g., if the speed when the machine 100 entered the graded surface 30 is greater than the speed of the machine 100 on the graded surface 30 prior to activating the ARC strategy); and/or determine the speed of the machine 100 as the machine exits the graded surface 30 onto the flat lower surface 40. Optionally, activation of the ARC strategy may inhibit a throttle lock function and/or throttle pedal commands. For example, the controller 120 may output commands to inhibit the throttle lock function and/or throttle pedal commands. Optionally, in one or more embodiments, a throttle lock function may be implemented and, if implemented, may be in an "ON" state, but disabled, during implementation of the ARC strategy.

The control system 400, for instance, the controller 120, may also: determine a virtual gear having a maximum speed limit equivalent that matches the speed of the machine 100 as the machine 100 exits the graded surface 30 onto the flat lower surface 40; deactivate the ARC strategy if the ARC strategy is active, for instance, responsive to a determination that the machine 100 exited the graded surface 30; and/or control downshift of the transmission system 140 to the virtual gear if the ARC strategy was active upon the transition onto the flat lower surface 40, but is now deactivated, for instance, in response to the determination that the machine 100 exited the graded surface 30 onto the flat lower surface 40. A maximum speed limit equivalent may correspond to a maximum speed allowable by the virtual gear that matches the speed of the machine 100 as the machine 100 exits the graded surface 30 onto the flat lower surface 40.

The controller 120 may output a virtual gear control signal 470, which may correspond to a calculated virtual gear with a maximum speed limit equivalent corresponding to a speed of the machine 100 prior to the machine 100 exiting the graded surface 30 (i.e., when ARC is active). For example, the calculated virtual gear with the maximum speed limit equivalent may correspond to a current speed of the machine 100 just prior to exiting the graded surface 30. The virtual gear control signal 470 may be applied to downshift the machine 100 to the virtual gear (lower gear) when the machine 100 exits the graded surface 300 onto the flat lower surface 40, particularly where the ARC mode was active as the machine 100 exited the graded surface 30 and the ARC mode is no longer active upon the machine 100 exiting the graded surface 30. If the ARC mode is not active (i.e., inactive or suspended) as the machine 100 exited the graded surface 30, the virtual gear control signal 470 may not be output, since the machine 100 may not be downshifted when the machine 100 exits the graded surface 300 onto the flat lower surface 40.

Thus, in one or more embodiments, the controller 120 may control downshift of the transmission system 140 to the virtual gear, for instance, responsive to the determination that the machine 100 exited the graded surface 30, if a current gear of the transmission system 140 is greater than the virtual gear. Additionally or alternatively, in the context of a mechanical transmission, for instance, the controller 120 may control downshift of the transmission system 140 to the virtual gear, responsive to the determination that the machine 100 exited the graded surface 30, if a current gear of the transmission system 140 has a minimum speed limit equivalent that is greater than the speed of the machine 100 as the machine 100 exits the graded surface 30 onto the flat lower surface 40. For example, in one or more embodiments of the disclosed subject matter, if the ARC control strategy forced the machine 100 into a lower gear than the machine 100 started in for the graded surface 30, the machine 100 may be kept in that gear at the end of the graded surface 30 (e.g., for mechanical transmissions).

Optionally, the controller 120 may have a downshift determining module 122 and a gear selection module 124 to implement some or all of the above-discussed operations. The modules may be implemented using circuitry of the controller 120 (e.g., an FPGA, memory, sub-processors, etc.) and/or computer-program algorithms, such as set forth in and based on FIGS. 5 and 6. Generally speaking, downshift determining module 122 may be active once the ARC mode is active and the machine 100 is on the graded surface 30. Gear selection module 124 may be active when the machine 100 exits the graded surface 30 when the ARC mode is active upon exiting the graded surface 30. Thus, the operations of gear selection module 124 may not be implemented if the ARC mode was activated while the machine 100 is on the graded surface 30 but is now inactive or suspended upon the machine 100 exiting the graded surface 30.

The downshift determining module 122 may receive as inputs: signals corresponding to the input gear 410, which may represent the gear indicator associated with a gear of the transmission system 140 of the machine 100 as the machine 100 enters the graded surface 30 from the flat upper surface 20; the FNR state 420; the ARC state (e.g., active or inactive) 430; the grade state (e.g., flat or graded surface) 440; and the speed 450 of the machine 100. As noted above, the gear indicator may be information or data that identifies the gear of the transmission system 140 of the machine 100 as the machine 100 enters the graded surface 30 from the flat upper surface 20.

Based on the input signals, the downshift determining module 122 may utilize the ARC active state and the grade state corresponding to the terrain 10 to determine an ARC downshift mode and set a resume flag. The downshift determining module 122 may output to the gear selection module 124 an ARC downshift mode signal 476 corresponding to the ARC downshift mode and the resume flag signal 478. Optionally, the resume flag signal 478 may be associated with a so-called single operator request by an operator of the machine 100, which may be a one-action request (e.g., one click) to an operator interface of the machine 100. The downshift determining module 122 may also set a resume gear to the input gear input by the input gear 410.

The downshift determining module 122 may output to the gear selection module 124 a resume gear signal 472 corresponding to the resume gear set by the downshift determining module 122. Based on the speed 450 of the machine 100 and optionally the FNR state 420 of the machine 100, the downshift determining module 122 may convert the speed and the FNR state of the machine 100 to an equivalent ARC gear. As noted above, the equivalent ARC gear may be a calculated virtual gear with a maximum speed limit equivalent corresponding to a speed of the machine 100 prior to the machine 100 exiting the graded surface 30 (i.e., when ARC is active). For example, the calculated virtual gear with the maximum speed limit equivalent may correspond to a current speed of the machine 100 just prior to exiting the graded surface 30. The downshift determining module 122 may output to the gear selection module 124 a signal corresponding to the equivalent ARC gear 474.

The gear selection module 124 may receive, as input(s), the signals/commands discussed in the preceding paragraph. The gear selection module 124 may also receive a shift command 460. The shift command 460 may be a single request by the operator of the machine 100, which may be a one-action request (e.g., one click) to the operator interface of the machine 100.

The gear selection module 124 may control automatic downshift of the machine 100 to the equivalent ARC gear associated with the signal corresponding to the equivalent ARC gear 474. Optionally, such automatic downshift may be enacted when the ARC downshift mode is set pursuant to the ARC downshift mode signal 476. Further, the gear selection module 124 may determine and output the virtual gear control signal 470 to be applied when the machine 100 is controlled to downshift to the determined virtual gear (lower gear). As noted above, such virtual gear control signal 470 may be applied to downshift the machine 100 to the virtual gear (lower gear) when the machine 100 exits the graded surface 300 onto the flat lower surface 40, particularly where the ARC mode was active as the machine 100 exited the graded surface 30 and the ARC mode is no longer active upon the machine 100 exiting the graded surface 30. If the ARC mode was not active (i.e., inactive or suspended) as the machine 100 exited the graded surface 30, the virtual gear control signal 470 may not be output, since the machine 100 may not be downshifted when the machine 100 exits the graded surface 300 onto the flat lower surface 40.

The gear selection module 124 may output a control signal (not expressly shown) to automatically resume the gear associated with the resume gear signal 472 in response to the shift command 460, which, as noted above, may be a one-action request from the operator of the machine 100. Such automatically resuming the gear may be performed only when the resume flag signal 478 is active or set. Further, such automatically resuming the gear associated with the resume gear signal 472 may skip one or more intervening fractional (or virtual) gears between a present gear of the transmission system 140 of the machine 100 and the gear associated with the resume gear signal 472. Optionally, the gear selection module 124 may stay active for a set time frame. If the shift command 460 is received within the set time frame, the gear selection module 124 may output the resume gear signal 472 as the control signal, for instance, to other portions of the controller 120, to automatically resume the gear associated with the resume gear signal 472.

Thus, the controller 120, based on the inputs 410, 420, 430, 440, and 450, may, when transitioning from the graded surface 30 onto the flat lower surface 40, automatically down shift a gear ratio of the transmission system 140 (e.g., of a CVT) of the machine 100. The controller 120 also may change the ARC mode from enabled to disabled, if the ARC mode is active. Optionally, when the machine 100 is on the flat lower surface 40, the shift command 460, which may be an upshift command, may be provided and may directly change the gear ratio to a gear at which the machine 100 was travelling before entering the graded surface 30, for instance, just prior to transitioning to the graded surface 30.

INDUSTRIAL APPLICABILITY

Continuous variable transmission (CVT), and in particular, electric drive machines with automatic retarding control (ARC) system strategies, such as machine 100, may enable speed control while operating on graded surfaces, such as graded surface 30. The ARC system may reduce the machine's speed regardless of operator commands while on a grade. Because of the potentially slower, controlled machine speed(s), it may be possible to have an unintended acceleration when transitioning out of an ARC controlled state and off of the grade surface. This may occur when an operator's physical commands, travelling with throttle lock on or the use of the throttle pedal, may increase machine speed above the previously controlled speed. The sudden change in machine acceleration with no change in operator input may be perceived as unintended acceleration. Such accelerations may be more significant on CVT and electric drive machines in which machine acceleration may be faster relative to gear-based transmission equivalent machines.

According to one or more embodiments of the disclosed subject matter, with improved retarding controls and non-discrete (virtual) gears, it is possible to remove, reduce, or minimize unintended accelerations when a machine, such as the machine 100, exits a graded surface and ARC turns off, if previously on when the machine 100 is exiting the graded surface. For example, in some embodiments of the disclosed subject matter, the following checks may be performed: (i) whether the ARC mode was active as the machine exited the graded surface and/or (ii) whether the ARC mode was active on the graded surface but is no longer active, for instance, because the ARC mode has been inactivated or suspended when the machine is on the graded surface. If ARC mode is determined to be active as the machine exits the graded surface, the machine may be controllably downshifted to the determined gear (e.g., virtual gear). In contrast, if the ARC mode is no longer active as the machine exits the graded surface, the machine may not be controllably downshifted. Thus, some embodiments of the disclosed subject matter may remove, reduce, or minimize unintended acceleration when the machine exits a graded surface onto a flat lower surface.

In one or more embodiments, in order to remove or reduce unintended acceleration when exiting graded surfaces, information from the machine 100 may be used to automatically downshift the machine 100 to a virtual gear that may prevent, reduce, or minimize unintended accelerations when exiting the graded surface onto the flat lower surface (horizontal surface) and transitioning out of an ARC controlled state. More specifically, a control system, apparatus, and method thereof may, generally speaking, identify a speed of the machine 100 prior to the machine 100 exiting the graded surface 30, calculate a virtual gear with a maximum speed limit equivalent to the speed of the machine 100 when ARC is active on the graded surface 30, and cause the machine 100 to downshift to the virtual gear (lower gear) when the machine 100 exits the graded surface 30 and to transition from the ARC control mode or strategy, particularly when the ARC was active when the machine 100 exited the graded surface 30 and is now inactive. Such control when the machine 100 exits the graded surface 30 may prevent, reduce, or minimize unintended acceleration. A single upshift command (e.g., one-click) may be employed to return to a previous gear instead of performing multiple upshift commands.

Put another way, a control strategy according to one or more embodiments of the disclosed subject matter may calculate a virtual gear that has a maximum speed limit equivalent to the current speed of the machine 100 during ARC usage on a graded surface, such as graded surface 30. When exiting the graded surface 30, and thus ARC control when active upon exiting the graded surface 30, the control strategy may force a downshift, if necessary, to a lower virtual gear, which may remove or reduce the ability for the machine 100 to accelerate regardless of operator command.

The operator may perform an upshift command to return to faster machine speeds. In addition to the automatic downshift strategy of the control strategy, the control strategy may store data or information corresponding to the selected virtual gear that was in use prior to ARC usage. For a set period of time after the automatic downshift has occurred, the operator may be able to perform a single upshift command to return to that previous virtual gear, regardless of the number of operator commands that would typically be required to return to that virtual gear.

Figure 5:
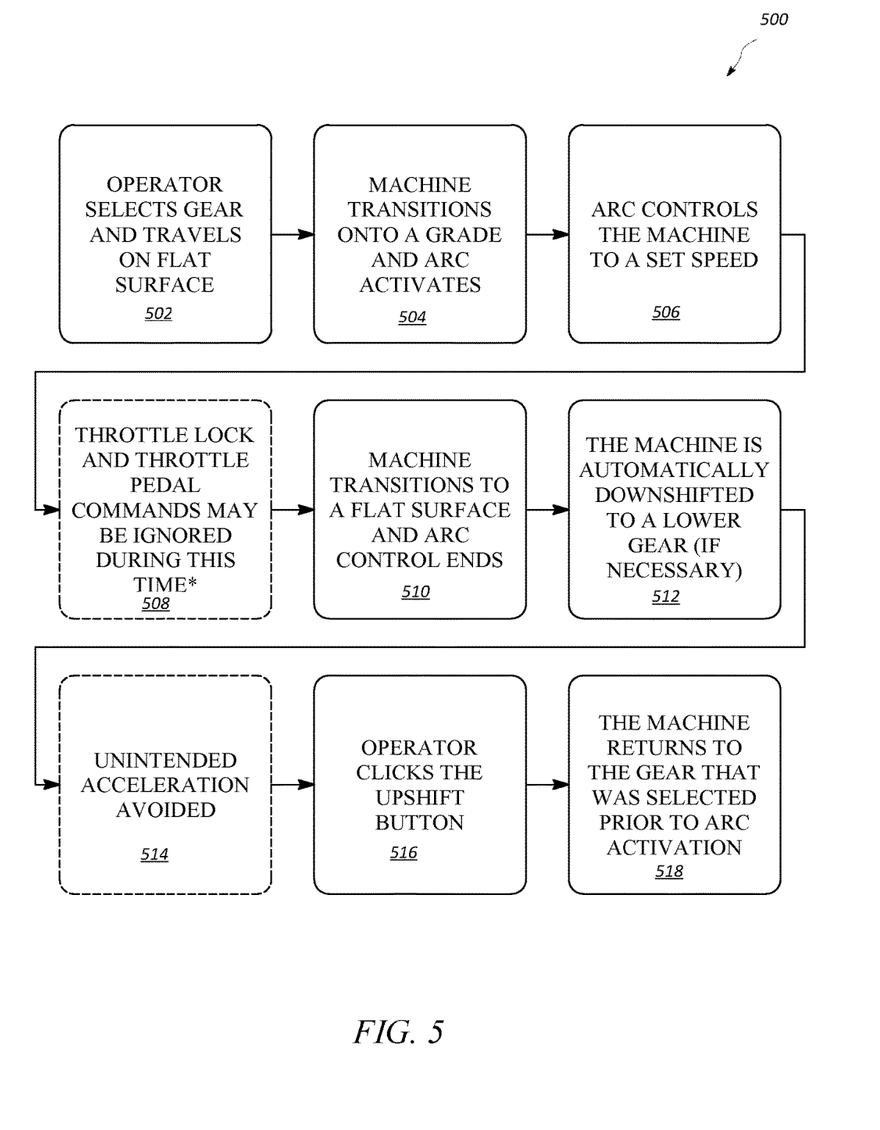
FIG. 5 is a functional block diagram of a control strategy for controlling acceleration of a machine according to one or more embodiments of the disclosed subject matter.

FIG. 5 is a functional block diagram of a control strategy 500 for controlling acceleration of a machine according to one or more embodiments of the disclosed subject matter. Generally speaking, blocks 502-518 may represent operations performed as part of the control strategy 500. Such blocks may be performed by the control system 400 as describes above, for instance. The control strategy 500 may be implemented in machines, such as machine 100, that implement or do not implement throttle lock or an analog thereof, such as cruise control.

At block 502, a gear may be selected, for instance, by the operator of the machine 100, and the machine 100 may be controlled on a flat surface, such as flat upper surface 20 shown in FIG. 1.

At block 504, the machine 100 may transition onto a graded surface, such as graded surface 30 shown in FIG. 2. At this time, the machine 100 may, generally speaking, transition from an operator controlled state to an ARC controlled state. In particular, the machine 100 may determine that it has transitioned to the graded surface 30 using corresponding one or more sensors. Upon determining that the machine 100 has transitioned to the graded surface 30, ARC control may be activated, for instance, by the controller 120 based on a detected grade of the machine 100. Additionally, if the machine 100 is configured with a throttle lock feature (or an analog thereof, such as cruise control), such feature may remain enabled. Alternatively, the machine 100 may have a throttle lock feature (or an analog thereof), but such feature may not be enabled when the machine 100 transitions to the graded surface 30. In yet another alternative, the machine 100 may not have a throttle lock feature (or an analog thereof). Also, optionally, a current gear of the machine 100 just prior to or as the machine 100 transitions to the graded surface 30 may be latched or saved in memory, such as memory 130 of the machine 100, for later retrieval.

At block 506, the ARC control strategy may activate to control the speed of the machine 100 to a set speed. For example, the ARC control strategy may reduce and/or limit the speed of the machine 100 to a speed less than the speed at which the machine 100 entered the graded surface 30. Regarding the ARC control strategy, the grade of the graded surface 30 may change, so the machine 100 may be slowing down or speeding up to match or maintain the set speed. At block 506, equivalent gear matches to match or maintain the set speed may be continuously or periodically determined while the ARC control strategy is active, prior to the machine 100 exiting the graded surface 30. That is, the control strategy 500 may continuously or periodically determine a virtual gear with a maximum speed limit corresponding to the set speed of the machine 100. And the speed of the machine 100 may be continuously or periodically determined, particularly as the machine 100 exits the graded surface 30.

At block 508, optionally, a throttle lock function, if available, and/or throttle pedal commands, may be inhibited as the machine 100 is on the graded surface 30 and under ARC control strategy. Optionally, the ARC control strategy may be made inactive or suspended when the machine 100 is on the graded surface 30.

At block 510 the control strategy 500 may detect that the machine 100 is beginning transition, is in the middle of transition, and/or has transitioned from the graded surface 30 to a flat surface, such as flat lower surface 40 illustrated in FIG. 3. So the block 510 of the control strategy 500 may determine, ultimately, an equivalent gear (i.e., virtual gear) that matches the speed of the machine 100 as the machine 100 begins to exit, is exiting, and/or has exited the graded surface 30. At one of these times, the ARC control strategy may be controlled, for instance, by the controller 120, to stop or become inactive. The block 510 may be implemented for machines 100 that have throttle lock (or an analog thereof) still enabled at this phase, do not have throttle lock enabled at this phase, or do not have throttle lock implemented, but, for example, the operator may have his or her foot on the throttle at the end of the graded surface 30 (e.g., the operator may not realize the state of the throttle), which may otherwise make the machine 100 accelerate or try to accelerate upon the transition onto the flat lower surface 40.

At block 512, if the ARC control strategy was active upon the transition from the graded surface 30 onto the flat lower surface 40 and the ARC control strategy is now inactive, the machine 100 may be automatically downshifted to a lower gear (if necessary). For example, the machine 100 may be shifted to a previously calculated gear (e.g., virtual gear) with a maximum speed limit equivalent to the speed of the machine 100 when ARC is active on the graded surface 30. Such downshifting may occur regardless of what acceleration-related control inputs (e.g., accelerator pedal, brake pedal, etc.) are input by the operator of the machine 100. Automatic downshift at block 512 may not occur when the ARC control strategy was active on the graded surface 30 but is no longer active, for instance, because the ARC mode has been inactivated or suspended when the machine 100 is on the graded surface 30 (i.e., prior to transitioning onto the flat lower surface 40). Optionally, automatic downshift at block 512 may not occur in a situation where the machine speed limit for the virtual gear is equal to the machine's current speed. For example, if the machine 100 enters the graded surface 30 at 20 mph, the set speed limit for the graded surface 30 is 20 mph, and the machine 100 exits onto the flat lower surface 40 at 20 mph, then the equivalent gear may be the one the machine 100 is already in. As another example, if ARC control does not activate, e.g., if the machine 100 traveling at 10 mph and the speed limit for graded surface is 20 mph, as long as the machine 100 never reaches 20 mph, then the ARC control strategy may not activate, and the machine 100 may not get downshifted, because the operator may always be in control of the machine 100 in this scenario, and not the automated control. Thus, in some embodiments of the disclosed subject matter, the ARC control strategy may not activate when the machine 100 is determined to transition to the graded surface 30 and when the current machine speed is slower than the gear that the machine 100 was in that the operator had selected.

Thus, block 514 may represent that the control strategy 500 may eliminate, reduce, or minimize an unintended acceleration when the machine 100 exits the graded surface 30 onto the flat lower surface 40, via the automatic downshifting, for instance, regardless of what acceleration-related control inputs are input by the operator of the machine 100.

At block 516 the operator may provide a control input to accelerate the machine 100. In particular, the operator may provide a single operator input (e.g., a single input to an operator control interface) to cause the machine 100 to upshift. Optionally, the single operator input functionality may be active for a predetermined amount of time upon transitioning onto the flat lower surface 40, or upon the automatic downshift. For example, the single operator input functionality may be available for ten seconds after the machine 100 transitions onto the flat lower surface 40 or after the automatic downshift. The single operator input may be different than, and an alternative to, a throttle lock resume control input, that enables the throttle lock (or an analog thereof). Alternatively, the single operator input may be an upshift command input (e.g., upshift button).

At block 518 the machine 100 may be controlled to return to a higher gear based on the control input at block 516. The higher gear may be the gear of the machine 100 just prior to the machine 100 transitioning to the graded surface 30 and ARC control strategy activation, for instance. A gear value of the higher gear may be saved in memory of the machine 100, such as the memory 130, and retrieved by the controller 120 to output an upshift command to perform the upshifting.

Such upshifting may proceed directly to the higher gear associated with the gear value regardless of the current gear of the machine 100. Thus, depending upon the current gear of the machine 100, the upshift may skip one or more intervening fractional (or virtual) gears to reach the higher gear. For example, if the machine 100 has fractional gears (e.g., 2.1, 2.2, 2.3), rather than whole number gears, the machine 100 was running in gear 3.5 just prior to transitioning to the graded surface 30, and the gear was reduced to gear 2.2 for the graded surface 30, then the control input at block 516, via the single operator input, may cause an upshift of the machine 100 directly to gear 3.5, rather than having to receive multiple operator control inputs (including holding a control input while the upshift traverses through intervening gears). Put another way, as an example, without some embodiments of the disclosed subject matter, the operator may provide a control input to upshift once to go to the next major gear (integer, e.g., from 2.5 to 3) and then have to hold the upshift control input to increment fractional gears until reaching the ultimate gear (e.g., 3.1, 3.2, 3.3, 3.4 until reaching 3.5). In contrast, according to some embodiments of the disclosed subject matter, the operator may provide the control input to upshift once to perform the upshift to the ultimate gear (e.g., 2.5 to 3.5).

Figure 6:
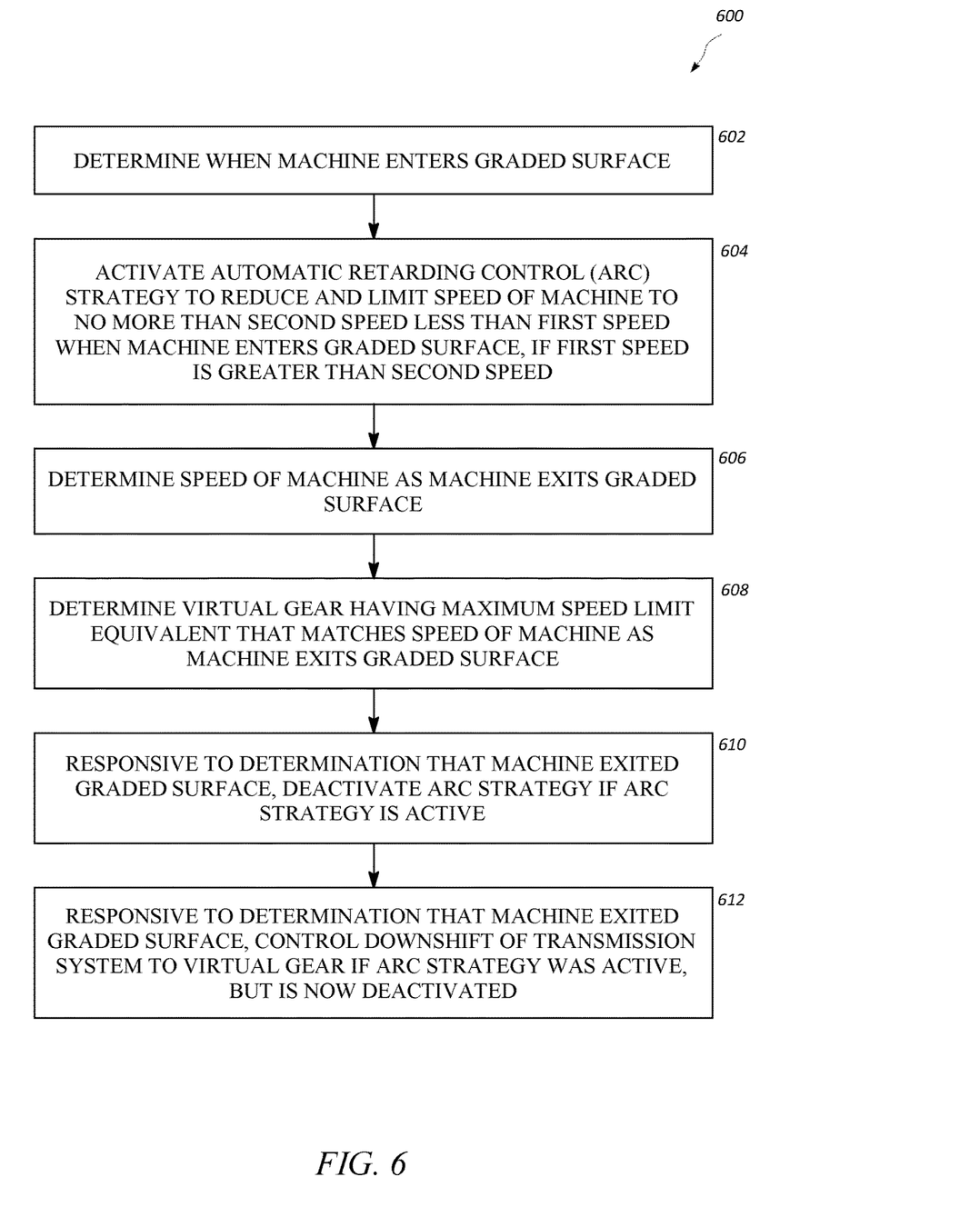
FIG. 6 is a flow chart of a method or algorithm for controlling acceleration of a machine according to one or more embodiments of the disclosed subject matter.

FIG. 6 is a flow chart of a method or algorithm 600 for controlling acceleration of a machine, such as machine 100, according to one or more embodiments of the disclosed subject matter. Optionally, the method or algorithm 600 may be performed by or using the controller 120.

At block 602, the method 600 may determine when a machine, such as machine 100, enters or transitions to a graded surface, such as graded surface 30. Block 602 may also involve determining a speed of the machine 100 just before transitioning to the graded surface 30. Block 602 may also involve recording a gear indicator associated with the determined speed. Optionally, the gear indicator may be save in memory, such as memory 130.

At block 604, the method 600 may activate an automatic retarding control (ARC) strategy to reduce or limit speed of the machine 100 to no more than a speed less than a speed when the machine 100 enters the graded surface 30. Thus, block 604 may also involve not activating the ARC strategy if the machine 100 has slowed down or is slowing down upon the transition to the graded surface 30.

At block 606, the method 600 may determine a speed of the machine 100 as the machine 100 exits the graded surface 30 to a flat lower surface, such as flat lower surface 140. The block 606 may also involve continuously determining the speed of the machine 100 prior to the machine 100 exiting the graded surface 30, for instance, from the transition to the graded surface from a flat upper surface, such as flat upper surface 20. Block 606 may also involve determining when the machine 100 begins exiting the graded surface 30, is exiting the graded surface 30, and/or has exited the graded surface 30.

At block 608, the method 600 may determine a virtual gear having a maximum speed limit equivalent that matches the speed of the machine 100 as the machine 100 begins exiting the graded surface 30, is exiting the graded surface 30, and/or has exited the graded surface 30.

At block 610, the method 600 may deactivate the ARC control strategy, if the ARC control strategy is active, in response to a determination that the machine 100 is exiting or has exited the graded surface 30 onto the flat lower surface 40.

At block 612, the method 600 may control or cause downshift of the transmission system 140 of the machine 100 to the virtual gear determined at block 608 in response to the determination that the machine 100 has exited the graded surface 30 onto the flat lower surface 40. Such downshift at block 612 may be performed if the ARC control strategy was active as the machine exited the graded surface and the ARC control strategy has been deactivated at block 610. Conversely, such downshift at block 612 may not be performed if the ARC control strategy was active when the machine 100 was moving down the graded surface 30, but is now inactive or suspended prior to transitioning from the graded surface 30, for instance, because the ARC control strategy has been inactivated or suspended when the machine 100 is on the graded surface 30. Further, the downshift at block 612 may be performed if a current gear of the transmission system 140 of the machine 100 is greater than the virtual gear determined at block 608. Additionally or alternatively, in the context of a mechanical transmission, for instance, the downshift at block 612 may be not performed if a current gear of the transmission system 140 has a minimum speed limit equivalent that is greater than the speed of the machine 100 as the machine 100 exits the graded surface 30. For example, in one or more embodiments of the disclosed subject matter, if the ARC control strategy forced the machine 100 into a lower gear than the machine 100 started in for the graded surface 30, the machine 100 may be kept in that gear at the end of the graded surface 30.

The ARC mode, if active during the exit from the graded surface, may be deactivated during or upon the transition onto the flat surface, and the machine may be controllably downshifted to a determined gear (e.g., virtual gear) associated with a determined speed of the machine just prior to the machine exiting the graded surface.

That is, in some embodiments of the disclosed subject matter, the systems, methods, and apparatuses may check (i)

whether the ARC mode was active as the machine exited the graded surface and (ii) whether the ARC mode was active on the graded surface but is no longer active, for instance, because the ARC mode has been inactivated or suspended when the machine is on the graded surface. If ARC mode is determined to be active as the machine exits the graded surface, the machine may be controllably downshifted to the determined gear (e.g., virtual gear). In contrast, if the ARC mode is no longer active as the machine exits the graded surface, the machine may not be controllably downshifted.

Thus, systems, apparatuses, and methods according to the present disclosure may eliminate, reduce, or minimize unintended accelerations when a machine, such as the machine 100, exits a graded surface to a flat lower surface. Additionally or alternatively, systems, apparatuses, and methods according to the present disclosure may provide upshifting, via a single operator command (e.g., a single input to an operator interface), to return directly to a previous gear (e.g., virtual gear), for instance, a gear at which the machine was travelling just prior to entering the graded surface, instead of having to receive multiple operator commands to switch the gear back to the gear at which the machine was travelling just prior to entering the graded surface.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A control system to prevent unintended acceleration of a machine when the machine exits a graded surface onto a first horizontal surface, the control system comprising:
    a memory configured to store a gear indicator associated with a gear of a transmission system of the machine as the machine enters the graded surface from a second horizontal surface; and
    a controller in communication with the memory, the controller configured to:
    determine when the machine enters the graded surface,
    activate an automatic retarding control (ARC) strategy when the machine enters the graded surface to reduce and limit the speed of the machine to no more than a second speed less that is less than a first speed at which the machine is travelling when the machine enters the graded surface, if the first speed is greater than the second speed,
    determine the speed of the machine as the machine exits the graded surface,
    determine a virtual gear having a maximum speed limit equivalent that matches the speed of the machine as the machine exits the graded surface,
    determine whether the ARC strategy is active as the machine exits the graded surface,
    deactivate the ARC strategy if the ARC strategy is active as the machine exits the graded surface, and
    control downshift, of the transmission system, to the virtual gear if the ARC strategy was active as the machine exits the graded surface and is no longer active when the machine exits the graded surface.

2. The control system of claim 1, wherein activation of the ARC strategy inhibits a throttle lock function and/or throttle pedal commands.

3. The control system of claim 1, wherein the controller controls downshift of the transmission system to the virtual gear, responsive to: a determination that the machine exited the graded surface, and a determination that a current gear of the transmission system is greater than the virtual gear.

4. The control system of claim 1, wherein the controller performs control such that the downshift of the transmission system to the virtual gear is not performed if a current gear of the transmission system has a minimum speed limit equivalent that is greater than the speed of the machine as the machine exits the graded surface.

5. The control system of claim 1, wherein the controller is further configured to control upshift of the transmission system to the gear associated with the gear indicator responsive to a single request by an operator of the machine.

6. The control system of claim 5, wherein the control of the upshift to the gear associated with the gear indicator, responsive to the single request, occurs only when the single request is received within a predetermined time period after the machine exits the graded surface.

7. The control system of claim 5, wherein the control of the upshift to the gear associated with the gear indicator stored in the memory skips at least one virtual gear between the virtual gear and the gear associated with the gear indicator.

8. The control system of claim 1, wherein the first horizontal surface is the same as the second horizontal surface, the machine exiting the graded surface onto the first horizontal surface in a reverse direction.

9. The control system of claim 1, wherein a throttle lock function is in an on state, but disabled, during implementation of the ARC strategy.

10. The control system of claim 1, wherein the transmission system includes a continuous variable transmission (CVT).

11. A computer-implemented method of controlling unintended acceleration of a machine when the machine exits a graded surface onto a first horizontal surface, the computer-implemented method comprising:
    determining a speed of the machine as the machine exits the graded surface;
    determining a virtual gear having a maximum speed limit equivalent that matches the speed of the machine as the machine exits the graded surface;
    checking whether an automatic retarding control (ARC) strategy was active as the machine exited the graded surface and is no longer active, the ARC strategy reducing and limiting the speed of the machine to no more than a first speed that is less than a second speed of the machine at which the machine is travelling when the machine enters the graded surface; and
    controlling downshift of the transmission system to the virtual gear if the ARC strategy was active as the machine exits the graded surface and is no longer active when the machine exits the graded surface.

12. The computer-implemented method of claim 11, wherein the downshift of the transmission system to the virtual gear is controlled if a current gear of the transmission system is greater than the virtual gear.

13. The computer-implemented method of claim 11, wherein the downshift of the transmission system to the virtual gear is not performed if a current gear of the transmission system has a minimum speed limit equivalent that is greater than the speed of the machine as the machine exits the graded surface.

14. The computer-implemented method of claim 11, further comprising controlling downshift of the transmission system to a gear of the transmission system as the machine enters the graded surface from a second horizontal surface.

15. The computer-implemented method of claim 14, further comprising storing, in a memory, information that identifies the gear of the transmission system as the machine enters the graded surface from a second horizontal surface.

16. A machine comprising:
- a memory configured to store a gear indicator associated with a gear of a transmission system of the machine as the machine enters a graded surface from a first horizontal surface; and
- a controller in communication with the memory, the controller configured to:
- determine a speed of the machine as the machine exits the graded surface onto a second horizontal surface,
- determine a virtual gear having a maximum speed limit equivalent that matches the speed of the machine as the machine exits the graded surface,
- check whether an automatic retarding control (ARC) strategy was active as the machine exits the graded surface and is no longer active, the ARC strategy reducing and limiting the speed of the machine to no more than a first speed that is less than a second speed of the machine at which the machine is travelling when the machine enters the graded surface, and
- control downshift of the transmission system to the virtual gear if the ARC strategy was active as the machine exits the graded surface and is no longer active when the machine exits the graded surface.

17. The machine of claim 16, wherein the downshift of the transmission system to the virtual gear is controlled if a current gear of the transmission system is greater than the virtual gear.

18. The machine of claim 16, wherein the downshift of the transmission system to the virtual gear is not performed if a current gear of the transmission system has a minimum speed limit equivalent that is greater than the speed of the machine as the machine exits the graded surface.

19. The machine of claim 16, wherein the controller is configured to control downshift of the transmission system using the automatic retarding control (ARC) strategy to a gear of the transmission system as the machine enters the graded surface from a second horizontal surface.

20. The machine of claim 16, wherein the controller is configured to control storing of information that identifies the gear of the transmission system as the machine enters the graded surface from the first horizontal surface to a memory.

* * * * *